Jan. 6, 1959 K. O. JOHNSON 2,867,460
TURBINE ROTOR ASSEMBLY
Filed Oct. 21, 1953
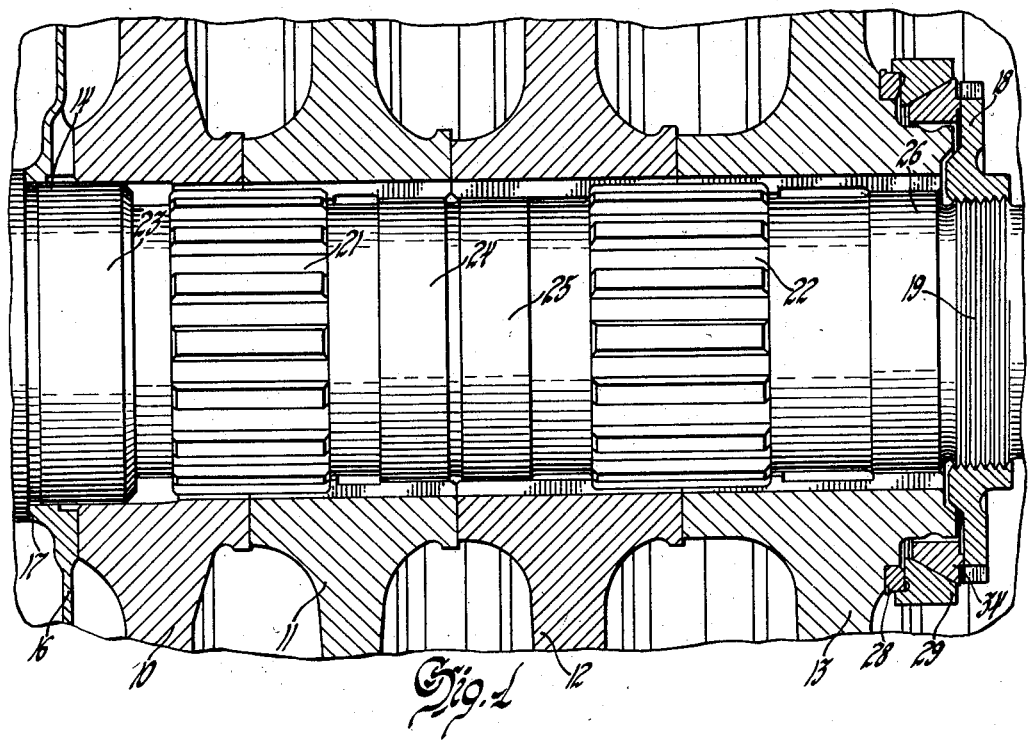
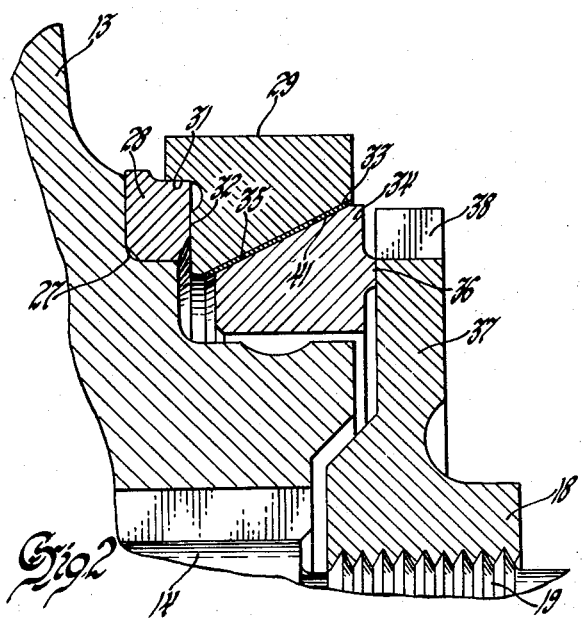
INVENTOR
Kenneth O. Johnson
BY
Paul Fitzpatrick
ATTORNEY United States Patent Office 2,867,460
Patented Jan. 6, 1959

2,867,460

TURBINE ROTOR ASSEMBLY

Kenneth O. Johnson, Camby, Ind., assignor to General Motors Corporation, Detroit, Mich., a corporation of Delaware Application October 21, 1953, Serial No. 387,503

7 Claims. (Cl. 287—52)

My invention relates to high temperature machinery and particularly to rotor assemblies of multistage gas turbines.

Such gas turbines may comprise a number of rotor wheels directly abutting, or abutting through intermediate sealing disks or spacer rings. The wheels may be retained on the shaft between an abutment and a nut threaded on the shaft. Since the wheels heat up to a greater extent and more quickly than the shaft when the machine is put into operation, there is a substantial difference in axial expansion between the hubs of the wheels and the shaft.

Experience has shown that not all of this differential expansion can be accommodated by elastic deformation and that some plastic deformation of the threads on the shaft or within the nut usually occurs with continued operation. As a result, the wheels are no longer tightly secured, and vibration of the rotor develops which may lead to failure thereof.

My invention is directed to providing an arrangement for retaining turbine wheels on a shaft or other tie member which will accommodate the differential expansion to such an extent that distortion of the parts and loosening of the wheel mounting does not occur.

The invention as illustrated herein is applied to a turbine rotor assembly of the type which is the subject of U. S. Patent No. 2,652,271, but it will be understood that it is applicable to other installations where the problem of compensating for thermal expansion arises.

The principal objects of the invention are to improve the reliability and longevity of gas turbines, and more specifically to provide an arrangement for retaining turbine wheels on a shaft or other mounting means which will accommodate relative thermal expansion of the parts.

The nature of the invention and the advantages thereof will be more clearly apparent from the succeeding detailed description of the preferred embodiment thereof and the accompanying drawings, in which:

Fig. 1 is a longitudinal sectional view of the portion of a gas turbine rotor adjacent the shaft and Fig. 2 is an enlarged view of a portion of Fig. 1.

The invention is shown in Fig. 1 as applied to a turbine rotor of the type disclosed in U. S. Patent Number 2,652,271. In this construction, the wheels 10, 11, 12, and 13 are mounted on a shaft 14. The wheels and a fan disk 16 are held in abutting relation and against a shoulder 17 on the shaft by a nut 18 retained on a threaded portion 19 of the shaft. The wheels are internally splined to engage external spline portions 21 and 22 on the shaft, and the wheels are aligned on the shaft by portions engaging cylindrical sections 23, 24, 25, and 26 of the shaft. This construction is as described in the above-mentioned patent except that in the previous disclosure the nut corresponding to nut 18 directly engages the hub of wheel 13 adjacent the surface of the shaft. With this prior construction it has been found that the excess of thermal expansion of the stack of turbine wheels over that of the shaft has caused distortion of the threads 19 or the threads of the nut 18 or both, so that the nut becomes loose and frees the wheels to some extent. In the construction according to the invention, which is shown more clearly in Fig. 2, this expansion is accommodated. A groove 27 is cut in the hub of the final wheel 13, which is of steel, and a steel ring 28 is mounted in the groove, bearing against a radial surface on the wheel. Ring 28 may be considered to be a part of wheel 13. A ring 29 of an alloy of high thermal expansion such as Inconel-X is piloted radially on the ring 28 at 31 and abuts the ring on the mating faces 32. The ring 29 has a conical inner surface 33 within which is seated an inner steel ring 34 having the same external taper as the internal taper of the ring 29. Ring 34 is out of contact with the ring 28 and wheel 13. An annular rib 36 on the rear face of the inner ring 34 engages the web 37 of the nut 18 adjacent the outer edge thereof. Grooves 38 are provided in the rim of the nut for cooperation with a spanner wrench for tightening the nut.

It will be noted that the web 37 is of considerable radial extent and is about three or four times as great in the radial dimension as in thickness along the axis of the turbine so that the nut will deflect to some extent under load. In a particular installation as described herein the deflection of the nut is about seven thousandths of an inch.

A further and preferably greater allowance for expansion is provided, however, by the conical rings 29 and 34 which have a conical surface making an angle of about 25 degrees with the axis. The inner face of the ring 29 and the outer face of the ring 34 are coated with a lubricant, the layer of lubricant being indicated as 41. The lubricant layer is provided by vapor blasting the surfaces 35 with molybdenum disulfide. By virtue of this lubricant, the rings can slide on each other, and as the assembly heats up their service, the outer ring will expand more than the inner ring, principally because of its higher coefficient of expansion. In the installation in question, this sliding back and forth of the ring 29 on the ring 34 with temperature changes amounts to a movement of about eight thousandths of an inch. While this is not a very great distance, tests have shown that this compensation together with the flexibility of rings 29 and 34 acting as a spring and the slight flexibility of the nut provides sufficient yielding to prevent damage to the parts and to maintain the tight seating of the nut against the rotor wheels even after long service.

In some cases sufficient accommodation for expansion might be had by the use of the conical rings without the additional benefit of the deflection of the nut. The actual amount of compensation due to both of these effects can be increased by increasing the radii of the rings.

It will be apparent that the ring 28 may be omitted and the ring 29 may be seated directly on and against the turbine wheel 13, if desired. The same form of compensation may be used where the member or members (tensioned retainers) holding the wheels together are not the shaft, as, for example, when they are bolts offset from the wheel axis. It will also be apparent that many other modifications of the disclosed embodiment of the invention may be made by the exercise of skill in the art and that the scope of the invention is not to be regarded as restricted by the detailed description.

I claim:

1. A turbine rotor assembly comprising, in combination, a plurality of wheels rotatable about an axis, means extending in the axial direction for binding the wheels together, and means interposed between the wheels and the first-mentioned means for compensating for relative axial thermal expansion of the wheels and the second-mentioned means comprising a continuous internally conical ring of relatively high thermal expansion and a continuous externally conical ring of relatively low thermal expansion slidably fitting within the first-mentioned ring.

2. A turbine rotor assembly comprising, in combination, a shaft having an abutment thereon, a retainer on the shaft adjustable axially thereof, a plurality of turbine wheels on the shaft between the abutment and retainer and urged against the abutment by the retainer, and means for transmitting thrust between the retainer and the wheel next thereto comprising a continuous internally conical ring of relatively high thermal expansion and a continuous externally conical ring of relatively low thermal expansion slidably fitting within the first-mentioned ring, and a lubricant between the engaging conical surfaces.

3. A turbine rotor assembly comprising, in combination, a shaft having an abutment thereon, a retainer on the shaft adjustable axially thereof, a plurality of turbine wheels on the shaft between the abutment and retainer and urged against the abutment by the retainer, and means for transmitting thrust betwen the retainer and the wheel next thereto comprising a continuous internally conical ring of relatively high thermal expansion and a continuous externally conical ring of relatively low thermal expansion slidably fitting within the first-mentioned ring.

4. A turbine rotor assembly comprising, in combination, a shaft having an abutment thereon, a retainer on the shaft adjustable axially thereof, a plurality of turbine wheels on the shaft between the abutment and retainer and urged against the abutment by the retainer, and means for transmitting thrust between the retainer and the wheel next thereto comprising a continuous internally conical ring of relatively high thermal expansion and a continuous externally conical ring of relatively low thermal expansion slidably fitting within the first-mentioned ring, the said means abutting the retainer at a zone spaced radially from the shaft.

5. A turbine rotor assembly comprising, in combination, a shaft having an abutment thereon, a retainer on the shaft adjustable axially thereof, a plurality of turbine wheels on the shaft between the abutment and retainer and urged against the abutment by the retainer, and means for transmitting thrust between the retainer and the wheel next thereto comprising a continuous internally conical ring of relatively high thermal expansion abutting the wheel and a continuous externally conical ring of relatively low thermal expansion slidably fitting within the first-mentioned ring and abutting the retainer, the ring abutting the retainer at a zone spaced radially from the shaft.

6. A turbine rotor assembly comprising a plurality of turbine wheels having a common axis and stacked adjacent one another in compressive relation along the axis and retaining means for maintaining the wheels in compressive relation comprising at least one retainer extending substantially parallel to the axis and having an abutment fixed thereon compressively coupled to one end wheel and an abutment adjustable thereon compressively coupled to the other end wheel, in combination with means for compensating for relative axial thermal expansion of the wheels and the retaining means comprising a continuous externally conical ring of relatively low thermal expansion and a continuous internally conical ring of relatively high thermal expansion slidably fitting over the outer surface of the externally conical ring, the rings being mounted between, and axially compressed between, one of the abutments and the end wheel adjacent thereto.

7. A turbine rotor assembly comprising a plurality of parts having a common axis and stacked in compressive abutting relation along the axis, with end parts at the ends of the stack and intermediate parts retained between the end parts, and retaining means for maintaining the parts in compressive abutting relation comprising at least one retainer extending substantially parallel to the axis and coupled to the end parts, the retainer being in tension, at least some of the intermediate parts being turbine wheels, in combination with means for compensating for relative axial thermal expansion of the parts and retaining means comprising a continuous externally conical ring of relatively low thermal expansion and a continuous internally conical ring of relatively high thermal expansion slidably fitting over the outer surface of the externally conical ring, the rings being mounted between, and axially compressed between, two of the parts.

References Cited in the file of this patent

UNITED STATES PATENTS

| | | |
|---|---|---|
| 123,413 | Newell | Feb. 6, 1872 |
| 1,382,606 | Morton | June 21, 1921 |
| 1,448,925 | Fulton et al. | Mar. 20, 1923 |
| 2,047,186 | Bates | July 14, 1936 |
| 2,652,271 | Gaubatz | Sept. 15, 1953 |
| 2,664,304 | Rathman | Dec. 29, 1953 |